United States Patent Office 3,597,449
Patented Aug. 3, 1971

3,597,449
STABLE GLYCOLIDE AND LACTIDE COMPOSITION
David Anthony Deprospero and Edward Emil Schmitt, Norwalk, Conn., assignors to American Cyanamid Company, Stamford, Conn.
No Drawing. Filed Nov. 16, 1967, Ser. No. 683,480
Int. Cl. C07d *15/10, 15/16*
U.S. Cl. 260—340.2                                       2 Claims

ABSTRACT OF THE DISCLOSURE

A composition comprising pure or impure solid glycolide or lactide immersed in tertiary amyl alcohol and/or tertiary butyl alcohol which is essentially anhydrous and free from glycolide or lactide reactive impurities.

Glycolide and lactide may be recrystallized from the composition to produce high yields of substantially pure glycolide or substantially pure lactide following storage of the composition for periods up to about three months.

BACKGROUND OF THE INVENTION

(1) Field of the invention

Lactones, specifically glycolide and lactide, and methods for preparing and using same.

(2) Description of the prior art

Glycolide and lactide are useful monomers for preparing polyglycolic and polylactic acids respectively. The characteristics of these polymers vary greatly depending upon the quality of the monomer. To produce polymers of sufficiently high molecular weight for use as fibers and self supporting films, it is essential to start with highly purified glycolide and lactide. U.S. Pats. 2,703,316, Schneider, Polymers of High Melting Lactides, and 2,668,162, Lowe, Preparation of High Molecular Weight Polyhydroxyacetic Ester, emphasize this need for high purity lactide and glycolide, respectively, in preparing high molecular weight polymers. For example, Lowe teaches that the presence of water or acid impurities in glycolide tends to retard polymerization, pointing out that polymerization of pure glycolide produces polymers having melt viscosities at 245° C. as high as 50,000 poises while polymers preapred from impure glycolide have melt viscosities of 400 poises or less, the latter polymers being unsuitable for use as fibers or self-supporting films.

Glycolide and lactide monomers are unstable compounds. They tend to degrade in the presence of certain impurities, particularly water. Degradation of these two compounds is erratic; sometimes one batch will degrade more rapidly than another similar batch, or one batch will degrade and another will not. This erratic behavior is believed to be caused by the existance of various polymorphic forms of glycolide and lactide, some of which are susceptible to degradation, while others are not.

Degradation presents two problems where high purity glycolide and lactide are required; first, if the product is pure, how can it be kept pure until used. This problem is frequently solved by using the pure material shortly after it is prepared. However, the preparation of fresh glycolide or lactide for every use is generally impractical. Storage in desiccators or other such devices is generally either unsatisfactory or impractical. Merely opening and closing a desiccator several times has, on occasion, so severly degraded pure glycolide that, even after repeated recrystallizations, it is unsuitable for preparing high molecular weight polymer. Secondly, glycolide and lactide are ordinarily prepared by thermal-cracking low molecular weight condensation polymers of glycolic or lactic acid to produce glycolide or lactide, and small amounts of water and organic impurities. The product is collected as an impure distillate which contains entrapped water condensate and other organic impurities from the cracking step. The distillate is usually solidified and purified by recrystallization. The glycolide or lactide is thus in intimate contact with degrading impurities until the purification procedure is completed. Such contact reduces glycolide and lactide yields and further complicates product purification by creating additional impurities which must be removed. There is always the additional possibility that should severe degradation occur prior to purification the entire batch may become useless as a monomer for high molecular weight polymer since subsequent repurification of the degraded material may then be of no avail. The longer the time interval between formation of the impure glycolide or lactide and purification, the worse the problem becomes.

There is therefore a need for a means of insulating pure and impure glycolide and lactide from substances which instigate their degradation.

SUMMARY OF THE INVENTION

This invention relates to a novel composition of matter useful for preventing the degradation of pure or impure lactones selected from the group consisting of glycolide and lactide. As used hereinafter the term "lactone" is defined to mean glycolide and lactide, with the term "lactide" including all of the well known optically isomeric forms of lactide or their mixtures such as, for example, L (−) lactide and D (+) lactide. By an "impure lactone" is meant a lactone containing sufficient amounts of impurities which, in any manner whatsoever, cause chemical degradation of the lactone.

More particularly this invention relates to a pure or impure solid lactone immersed in a liquid selected from the group consisting of tertiary amyl alcohol and tertiary butyl alcohol or mixtures thereof. Prior to immersion of the lactone therein, the liquid must be essentially anhydrous and free from lactone reactive impurities. The lactone will not degrade, provided it remains submerged in the liquid, for up to about three months. The stability is particularly surprising in the case of impure lactone wherein there is intimate contact between normally degrading impurities such as water and the lactone.

This invention further relates to a method for preparing substantially pure lactone from impure lactone in such a manner that the impure lactone is continuously stabilized almost from its formation until it is purified, which comprises collecting an impure lactone distillate in an agitated bath of tertiary amyl alcohol and/or tertiary butyl alcohol maintained at a temperature below the melting point of the lactone thereby preparing a slurry of particulate solid lactone in the alcohol. The alcohol must be essentially anhydrous and free from lactone reactive impurities prior to collection of the lactone therein. The lactone can be stably stored in slurry form for up to three months. When pure lactone is needed, additional alcohol, as characterized above, is added to the slurry, the slurry is then heated to solubilize the solids; the solution is cooled to produce lactone crystals which, if required can be similarly recrystallized from fresh tertiary amyl or tertiary butyl alcohol to produce substantially pure lactone.

It is a unique feature of the above method that there is continuous stability of the impure lactone almost from the time it is first produced as the impure distillate until it emerges purified for use despite intimate and prolonged contact with ordinarily reactive by-products.

It is an object of this invention to provide a means for stably storing pure and impure lactones.

It is another object of this invention to stabilize lactones by immersion in a liquid which is also a convenient recrystallization solvent for the lactone.

It is also an object of this invention to provide continuous stability of impure lactone from almost the moment it is formed in an impure state until purified for usage, thereby improving lactone yields and minimizing purification problems during the interval between initial production of impure lactone and emergence of the purified lactone.

A further object of this invention is to stabilize the lactone by immersion in a liquid in which impurities normally associated with lactones are at least partially soluble thereby coupling partial purification of the lactone with stable storage.

A still further object of the invention is to stabilize the lactone by immersion in a liquid having the ability to bind water in such manner that the water fails to degrade the lactone despite its intimate contact with the lactone.

These and other objects of the invention will become apparent from the following discussion.

DESCRIPTION OF THE PREFERRED EMBODIMENT

(1) Preparation of the stable composition

Before preparing the composition of this invention, it is necessary to insure that the tertiary amyl and/or tertiary butyl alcohols are essentially anhydrous and free from lactone reactive impurities. The term "essentially anhydrous" means that the water content of the alcohol does not exceed 0.5%, although a water content of 0.1% or less is preferred. Commercial t-amyl and t-butyl alcohols must ordinarily be predried to insure low water content using conventional methods such as that shown in Example A hereinbelow.

It is equally important that the alcohols contain no lactone reactive impurities. It is desirable to pretreat the alcohols with small amounts of lactone to promote reaction and dissipation of these impurities. The reacted impurities are then removed conventionally. Example A describes a preferred technique for removal of these impurities.

The lactone may originate from many sources. For example, the lactone may be freshly prepared pure material which is to be stored for future use. It may be immersed as crystal or amorphous particles of various sizes and shapes, or as large continuous chunks. When needed, the alcohol is removed and the product dried.

On the other hand, the lactone may be in an impure form such as typically occurs, for example, in the conventional method for preparing these lactones by the thermal cracking of low molecular weight condensation polymers of glycolic or lactic acids to form an impure lactone distillate. A particularly convenient method of preparing the inventive composition in this instance is to collect the impure distillate in an agitated bath of the alcohol maintained at a temperature below the melting point of the lactone. As the distillate strikes the cooler alcohol, it is prilled into fine irregularly shaped particles of solid lactone. In the case of impure lactone, it is an advantage that the immersed lactone be finely divided in order to enhance extraction of impurities by the alcohol and to permit rapid solubilization of the solid in the alcohol for subsequent recrystalization of pure lactone. If fine particles are desired, it is essential that the alcohol be agitated to prevent the solidification of the lactone into a continuous mass. Particle size of the lactone is repsonsive to changes in operating variables such as alcohol temperature and degree of agitation. As lactone distillate is initially added to the alcohol, there will be some solubility of the lactone in the alcohol until the alcohol becomes saturated. The lactones are soluble in the alcohols to the extent of about 15% or less at the temperatures of interest. Lactone can be continuously added until either agitation is no longer possible or the lactone can no longer be submerged in the alcohol. Compositions containing from about 15% to about 75% lactone are operable, with a lactone content of about 50% preferred.

It is theorized that the selected alcohols have two particularly useful properties; first, they are solvents for water and the organic impurities normally asociated with the impure lactone. As a result, the alcohol extracts at least a portion of these materials from the lactone during storage resulting in partial purification of the lactone and a dilution of the potentially reactive impurities; secondly, the alcohols in their essentially anhydrous condition have a strong affinity for water, the material believed to exert the greatest degradative effect on the lactones. Tertiary amyl and tertiary butyl alcohol bind appreciable amounts of water in such manner that the water is not free to degrade the lactones despite its presence and prolonged contact with the lactones. This property becomes of increased importance when impure lactone distillate is collected in the alcohol since the distillate contains entrapped water which would accumulate in the composition to eventually trigger degradation of the lactone. Instead, the alcohol, by binding this water, neutralizes the effect of the water accumulation and preserves the lactone in a stable condition.

In preparing the composition of this invention, the alcohol must be maintained at a temperature below the lactone melting point. However, a narrower temperature range of about 30° to about 50° C. is preferable; too high a temperature will solubilize an excessive amount of lactone which upon cooling to room temperature for storage, will crystallize. These crystals cake together with solidified lactone to create an undesirable continuous mass, making further purification and handling more difficult. On the other hand, an alcohol temperature which is too low will impede the extraction of impurities from the lactone resulting in reduced purification of the lactone.

In a preferred embodiment impure glycolide or lactide distillate as prepared by thermally cracking a low molecular weight condensation polymer of glycolic or lactic acid, was collected in agitated tertiary amyl alcohol maintained at 30–50° C. respectively, until the glycolide or lactide content of the composition was about 50%. The tertiary amyl alcohol had been previously treated with the appropriate lactone to remove lactone reactive impurities and had been predried to a water content of 0.1% or less.

(2) Lactone storage

The composition of this invention will stably store the lactones for up to three months at temperatures below the lactone melting point. When the composition is initially prepared with impure lactone distillate for storage in excess of one month, it is desirable to replace the impurity laden alcohol in which the lactone was first immersed with fresh purified alcohol for storage.

(3) Lactone purification

Tertiary amyl and tertiary butyl alcohols are excellent lactone recrystallization solvents. This property makes the inventive composition particularly useful for storing impure lactone since pure lactone can be recrystallized when needed directly from the storage composition without a bothersome change of solvents. This convenience of recrystallization also makes the inventive composition a particularly useful vehicle for assuring continuous stability of the lactone almost from the moment it is first formed as an impure distillate until it emerges in purified form ready for use. After the composition is prepared the lactone may be stored therein in impure form until needed. It is then only necessary to add additional fresh alcohol to the composition and heat it to solubilize the solids. The solution is cooled producing lactone crystals which may, if necessary, be similarly recrystallized from fresh purified alcohol. A preferred method of purifying impure lactone which incorporates the inventive composition is shown hereinbelow in Examples 1 and 2.

The following non-limiting examples are presented to further illustrate the invention.

EXAMPLE A

Preparation of purified t-amyl alcohol (a) Removal of glycolide reactive impurities.—Into a suitable vessel are added 98 parts of commercial t-amyl alcohol and 2 parts of glycolide. The mixture is allowed to stand overnight at room temperature. During this period glycolide reactive impurities present in the t-amyl alcohol react with the glycolide causing their elimination. The alcohol is then separated from the glycolide and 100 parts of the impure alcohol is charged to a conventional packed column distillation unit operated at atmospheric pressure producing 93 parts of purified t-amyl alcohol distillate and 7 parts of a dark amber colored residue containing the impurities. Analysis of the purified alcohol by vapor phase chromatography and conductimetric nonaqueous titration techniques indicates a reduction in the glycolide reactive impurity content.

(b) Removal of water.—To a suitable vessel are added 70 parts of alcohol from (a) and 1 part of type 4–A molecular sieve (Linde, Inc.). After a contact time of 12–24 hours at room temperature, the alcohol is separated from the sieve. The water content is less than 0.1% (usual range 0.02–0.1%).

EXAMPLE 1

Preparation of stable glycolide composition

Into a suitable vessel are added 400 parts of commercial glycolic acid which is heated to 170–180° C. at atmospheric pressure to distill off water. The pressure is then slowly reduced to the equivalent of 5 mm. of Hg, maintaining the temperature indicated until water ceases to distill. The resultant mixture is allowed to cool, recovered, and ground into powder to yield 280 parts of the prepolymer.

About 280 parts of the prepolymer are slowly added to a flask purged with nitrogen and held at a pressure below 15 mm. of Hg at a temperature of about 275–300° C. Impure glycolide distillate is produced which is collected in a receiving vessel at a temperature of about 120° C. The hot glycolide is almost immediately added slowly to an agitated bath of purified t-amyl alcohol as prepared in Example A which is maintained at a temperature of 30–50° C. The glycolide solidifies upon contact with the alcohol to produce small irregularly shaped prilled particles. Glycolide is continuously added until a slurry containing about one part of glycolide per one part of alcohol is produced. As the glycolide contacts the alcohol, its color lightens with a corresponding darkening of the t-amyl alcohol. The slurry is then cooled to 20–25° C. with agitation for storage until needed. For short term storage (up to about one month), the slurry may be stored as is. For longer storage interval, it is desirable to remove the contaminated t-amyl alcohol replacing it with fresh t-amyl alcohol as prepared in Example A. During storage it is important that the glycolide be totally submerged in the alcohol.

EXAMPLE 2

Purification of crude glycolide

Into a suitable crystallizing vessel are charged 220 parts of purified t-amyl alcohol, as prepared in Example A, 48 parts of crude glycolide slurry as prepared in Example 1, and 3 parts of activated carbon. The solution was allowed to boil at 103° C. for five minutes. It was then filtered to remove the carbon and other insolubles. Glycolide was crystallized by cooling the solution to 0° C. The collected glycolide crystals were then subjected to a second identical recrystallization from purified t-amyl alcohol. The glycolide from the second crystallization was washed with 100 parts of trichloromonofluoromethane and dried overnight at 25–35° C. under vacuum to yield 18 parts of substantially pure glycolide.

EXAMPLE 3

Preparation of stable lactide composition

The theoretical amount of water corresponding to concentration and dehydration was removed from 208 parts of a 45% aqueous solution of L-lactic acid by distillation over a period of two hours at 70–80° C. under a pressure corresponding to 25 mm. of Hg. The remaining concentrate was heated to 230–235° C. (pot temperature) at atmospheric pressure. When this temperature was reached, the pressure of the system was reduced to 26 mm. of Hg. As the distillation continued, lactide distillate was produced at 136–137° C. The distillate was collected in t-butyl alcohol which had been pretreated in a manner shown in Example A.

EXAMPLE 4

Purification of crude lactide

Pure L-lactide was prepared following the procedure of Example 2 but using the crude lactide slurry of Example 3 and t-butyl alcohol prepared in the manner shown in Example A in place of the glycolide slurry and t-amyl alcohol.

We claim:

1. A method for preparing a substantially pure storage stable lactone slurry wherein said lactone is selected from the group consisting of glycolide and lactide from impure lactone, comprising:

collecting an impure lactone distillate in an agitated liquid selected from the group consisting of tertiary amyl alcohol and tertiary butyl alcohol, maintained at a temperature below the melting point of the lactone, the liquid being essentially anhydrous and free from lactone reactive impurities prior to the immersion of the lactone therein, and thereby producing a slurry of particulate solids immersed in the liquid, said slurry containing from about 15 to about 75% lactone.

2. The method of claim 1 wherein glycolide is collected in about 30–50° C. tertiary amyl alcohol containing less than 0.1% water prior to immersion of the glycolide therein to produce a slurry composition containing about 50% glycolide.

References Cited

UNITED STATES PATENTS 2,668,162  2/1954  Lowe _____ 260—340.2X
3,457,280  7/1969  Schmitt et al. _____ 260—340.2

NORMA S. MILESTONE, Primary Examiner

U.S. Cl. X.R.

260—78.3R